United States Patent
Chun et al.

(10) Patent No.: US 10,216,884 B2
(45) Date of Patent: *Feb. 26, 2019

(54) SIGNAL VIA POSITIONING IN A MULTI-LAYER CIRCUIT BOARD USING A GENETIC VIA PLACEMENT SOLVER

(71) Applicant: International Business Machines Corporation, Armonk, NY (US)

(72) Inventors: Sungjun Chun, Austin, TX (US); Matteo Cocchini, Long Island City, NY (US); Michael A. Cracraft, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,236

(22) Filed: Nov. 15, 2017

(65) Prior Publication Data

US 2018/0075180 A1 Mar. 15, 2018

Related U.S. Application Data

(63) Continuation of application No. 15/430,970, filed on Feb. 13, 2017, now Pat. No. 9,875,331, which is a (Continued)

(51) Int. Cl.
G06F 17/50 (2006.01)
(52) U.S. Cl.
CPC ...... *G06F 17/5072* (2013.01); *G06F 17/5081* (2013.01)

(58) Field of Classification Search
CPC .................. G06F 17/5072; G06F 17/5081
(Continued)

(56) References Cited

U.S. PATENT DOCUMENTS

| 5,615,124 A * | 3/1997 | Hemmi | G06F 17/5045 716/104 |
| 6,993,739 B2 * | 1/2006 | Becker | G06F 17/5036 716/112 |

(Continued)

OTHER PUBLICATIONS

List of IBM Patents or Patent Applications Treated as Related, Nov. 15, 2017, 2 pages.
(Continued)

*Primary Examiner* — Jack Chiang
*Assistant Examiner* — Brandon Bowers
(74) *Attorney, Agent, or Firm* — Cantor Colburn LLP

(57) ABSTRACT

One aspect includes identifying via groups that each includes a ratio of a plurality of signal vias to one ground via based on a design file defining a layout of a multi-layer circuit board. A genetic via placement solver iteratively evaluates potential placement solutions that adjust a placement of one or more of the signal vias until at least one solution is identified that meets one or more placement criteria of the signal vias. The genetic via placement solver performs a mutation and recombination of one or more solutions that do not meet the one or more placement criteria and re-evaluates the one or more solutions that do not meet the one or more placement criteria. The design file is modified to include at least one shifted signal via position based on identifying the at least one solution that meets the one or more placement criteria.

10 Claims, 8 Drawing Sheets

Related U.S. Application Data continuation of application No. 15/139,653, filed on Apr. 27, 2016.

(58) Field of Classification Search
USPC .......................................................... 716/119
See application file for complete search history.

(56) References Cited

U.S. PATENT DOCUMENTS

| | | | |
|---|---|---|---|
| 7,904,865 | B2 | 3/2011 | Yifrach et al. |
| 9,324,633 | B2 * | 4/2016 | Tan ..................... H01L 23/3135 |
| 2015/0143322 | A1 | 5/2015 | Liu et al. |
| 2015/0248512 | A1 | 9/2015 | Shen et al. |

OTHER PUBLICATIONS

U.S. Appl. No. 15/139,653, filed Apr. 27, 2016, Entitled: Signal via Positioning in a Multi-Layer Circuit Board Using a Genetic via Placement Solver, First Named Inventor: Sungjun Chun.

U.S. Appl. No. 15/430,970, filed Feb. 13, 2017, Entitled: Signal via Positioning in a Multi-Layer Circuit Board Using a Genetic via Placement Solver, First Named Inventor: Sungjun Chun.

U.S. Appl. No. 15/813,233, filed Nov. 15, 2017, Entitled: Signal via Positioning in a Multi-Layer Circuit Board Using a Genetic via Placement Solver, First Named Inventor: Sungjun Chun.

* cited by examiner

SIGNAL VIA POSITIONING IN A MULTI-LAYER CIRCUIT BOARD USING A GENETIC VIA PLACEMENT SOLVER

DOMESTIC PRIORITY

This application is a continuation of U.S. patent application Ser. No. 15/430,970, filed Feb. 13, 2017, which claims priority from U.S. application Ser. No. 15/139,653 filed Apr. 27, 2016, the entire contents of which are incorporated herein by reference.

BACKGROUND

The present application relates generally to circuit board manufacturing. More specifically, the present application is directed to signal via positioning in a multi-layer circuit board.

Printed circuit boards ("PCB") are generally fabricated from a plurality of laminated layers. Each of the layers typically includes a core fabricated from an insulating material, such as FR-4, epoxy glass, polyester or synthetic resin bonded paper, for example. Typically, a copper layer is bonded to one or both sides of the core. Circuits or "traces" are formed on the copper by applying a mask and removing unneeded copper. The individual layers are then laminated together to form the PCB.

Energy is typically transferred between layers of the PCB using power vias, signal vias, and ground vias. Signal vias are typically installed through all layers of a PCB even though the signal vias may only form an electrical connection between two of the layers. A portion of a signal via that extends through layers of the PCB beyond the points of electrical connection is referred to as a "stub". For high-speed signals, if stubs are not removed, sharp resonances can appear as an insertion loss, particularly in a differential signal pair.

Stubs can be removed by back-drilling the unused portion of the signal vias out of the PCB during manufacturing. However, the ability to back-drill signal vias is constrained by a minimum drilling distance defined between the signal vias. The potential for damaging the PCB increases considerably if the minimum drilling distance is violated. This minimum drilling distance effectively constrains the minimum pitch (i.e., center-to-center distance) that can be supported, and thus, limits signal density under a chip or module.

SUMMARY

Embodiments include a method of signal via positioning. The method includes identifying, by a via placement tool executing on a processor of a circuit design system, a plurality of via groups each including a ratio of a plurality of signal vias to one ground via based on a design file defining a layout of a multi-layer circuit board. A genetic via placement solver iteratively evaluates a plurality of potential placement solutions that adjust a placement of one or more of the signal vias until at least one solution is identified that meets one or more placement criteria of the signal vias. The genetic via placement solver performs a mutation and recombination of one or more solutions that do not meet the one or more placement criteria and re-evaluates the one or more solutions that do not meet the one or more placement criteria. The design file is modified to include at least one shifted signal via position based on identifying the at least one solution that meets the one or more placement criteria.

Embodiments also include a system having a design file defining a layout of a multi-layer circuit board including a plurality of via groups each including a ratio of a plurality of signal vias to one ground via. The system also includes a processor that is configured to iteratively evaluate a plurality of potential placement solutions that adjust a placement of one or more of the signal vias until at least one solution is identified that meets one or more placement criteria of the signal vias. The system performs a mutation and recombination of one or more solutions that do not meet the one or more placement criteria and re-evaluates the one or more solutions that do not meet the one or more placement criteria. The design file is modified to include at least one shifted signal via position based on identifying the at least one solution that meets the one or more placement criteria.

Embodiments also include a computer program product. The computer program product includes a computer readable storage medium having computer readable program code embodied therewith. The program instructions are executable by a processor to perform a method that includes identifying a plurality of via groups each including a ratio of a plurality of signal vias to one ground via based on a design file defining a layout of a multi-layer circuit board. Potential placement solutions are iteratively evaluated to adjust a placement of one or more of the signal vias until at least one solution is identified that meets one or more placement criteria of the signal vias. Mutation and recombination of one or more solutions that do not meet the one or more placement criteria are performed. Solutions that do not meet the one or more placement criteria are re-evaluated. The design file is modified to include at least one shifted signal via position based on identifying the at least one solution that meets one or more placement criteria.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
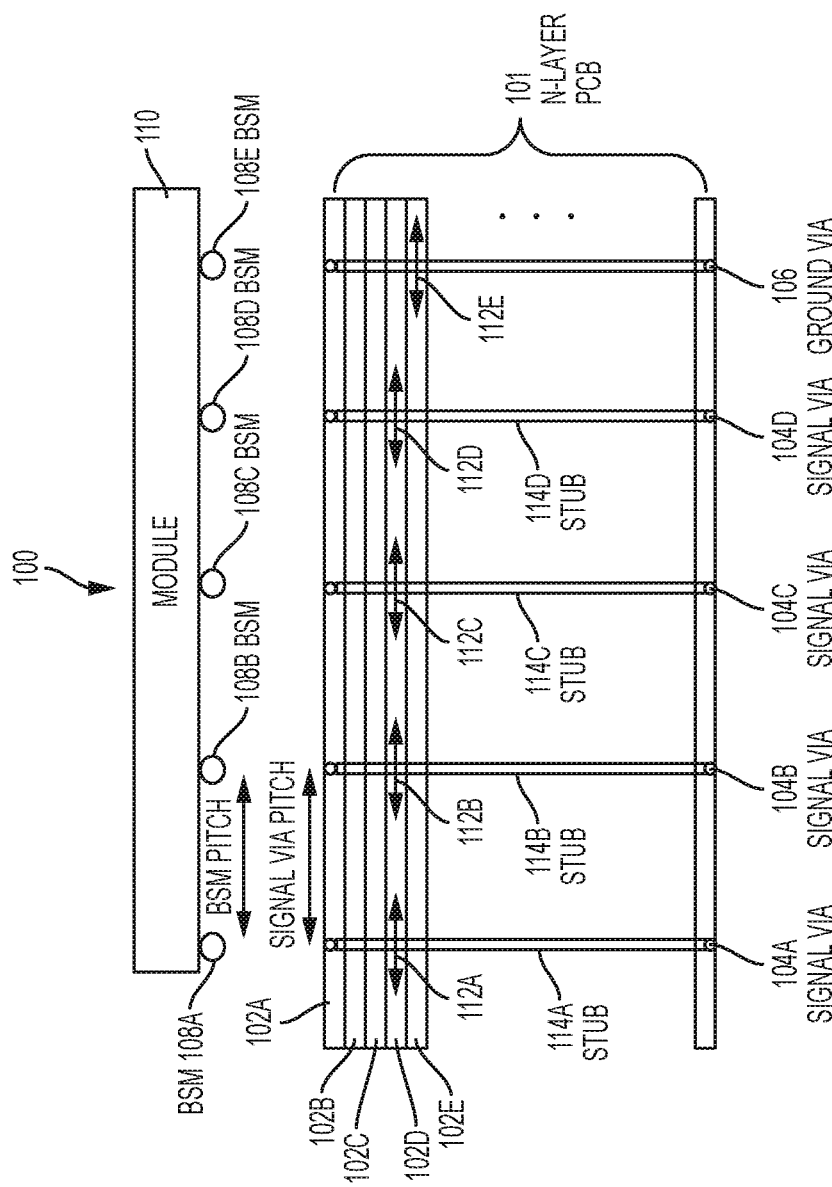
FIG. 1 is an exemplary diagram of a multi-layer circuit board manufactured according to aspects of exemplary embodiments.

Exemplary embodiments include systems, methods and computer program products for positioning of signal vias in a multi-layer circuit board. Signal vias may be grouped, for instance, to support differential signaling through the multi-layer circuit board. Each group of signal vias may also be associated with or include a ground via. Signal paths for higher speed signals that include signal vias may be sensitive to additional "stub" material that extends beyond a signal path to the bottom of a multi-layer circuit board, also referred to as printed circuit board (PCB). As depicted in FIG. 1, a system 100 can include a multi-layer circuit board 101. In the example of FIG. 1, the multi-layer circuit board 101 includes N-layers 102, where "N" is an arbitrary number, such as twenty. Layer 102A is an uppermost layer that interfaces signal vias 104 and ground vias 106 to bottom surface metal 108 (e.g., conductive contacts) of a module 110. The module 110 can be a chip or any type of package that can be coupled to the multi-layer circuit board 101 to form the system 100.

Various paths 112 may be routed to different layers 102 of the multi-layer circuit board 101. For example, signal path 112A, signal path 112B, signal path 112C and signal path 112D may be routed in layer 102D. Layers 102B and 102C may be reserved for other signal paths (not depicted), and ground path 112E may be routed in layer 102E. As depicted in FIG. 1, signal via 104A may extend between layer 102A and layer 102N of the multi-layer circuit board 101; however, the portion of signal via 104A between layers 102E and 102N forms a stub 114A since it extends below the signal path 112A. Electrical continuity is only needed between bottom surface metal 108A and the portion of signal via 104A that extends from layer 102A to layer 102D to reach the signal path 112A. Signal via 104B may extend between layer 102A and layer 102N of the multi-layer circuit board 101, and the portion of signal via 104B between layers 102E and 102N forms a stub 114B since it extends below the signal path 112B. Electrical continuity is only needed between bottom surface metal 108B and the portion of signal via 104B that extends from layer 102A to layer 102D to reach the signal path 112B. Similarly, signal vias 104C and 104D may extend between layer 102A and layer 102N of the multi-layer circuit board 101, and the portion of signal vias 104C and 104D between layers 102E and 102N forms stubs 114C and 114D respectively. Ground via 106 also extends from layer 102A to layer 102N. Although the ground via 106 is only needed between layers 102A and 102E for bottom surface metal 108E in the example of FIG. 1, there is no detrimental effect to signal quality by leaving the portion of ground via 106 intact between layers 102E and 102N. By back-drilling signal vias 104A-104D from layer 102N up to layer 102E, resonance effects can be reduced when stubs 114A-114D are removed. Additional signal vias may also be included between layers 102A-102N that do not require back-drilling due to a lower frequency of operation.

The center-to-center distances between a neighboring pair of bottom surface metal 108A and 108B (as well as bottom surface metal 108B to 108C and 108C to 108D) are referred to as the bottom surface metal pitch. The center-to-center distance between a neighboring pair of the signal vias 104A and 104B (as well as signal vias 104B to 104C and 104C to 104D) is referred to as the signal via pitch. A minimum value of the signal via pitch is limited due to manufacturing constraints as a target minimum drilling distance to allow back-drilling of the neighboring pair of the signal vias 104. Embodiments allow the bottom surface metal pitch to be designed with a value that is less than the target minimum drilling distance. In contrast, contemporary art solutions typically require that the bottom surface metal pitch be greater than the target minimum drilling distance.

Figure 2:
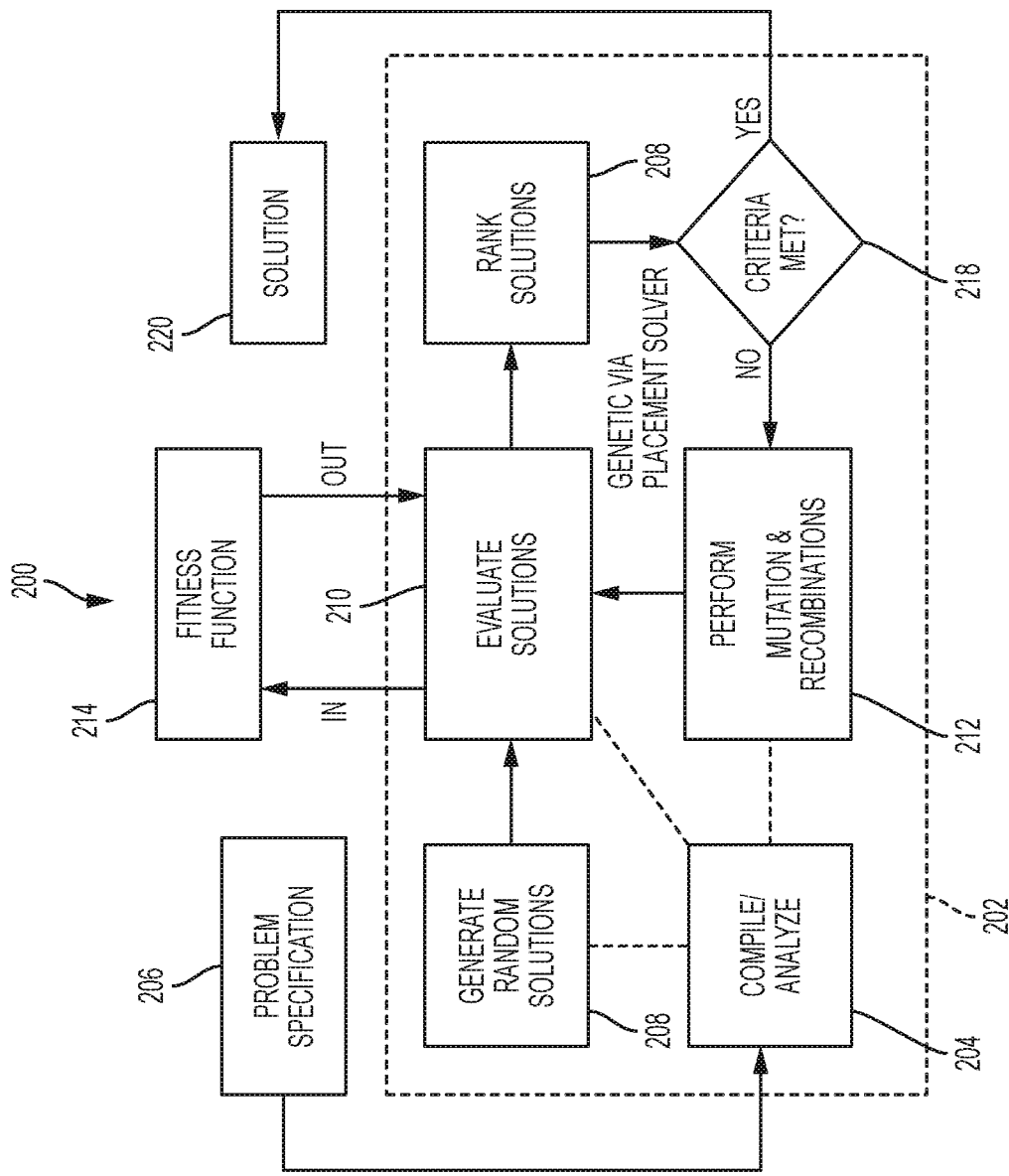
FIG. 2 depicts an example of a genetic algorithm process applied by a via placement tool according to aspects of exemplary embodiments.

FIG. 2 depicts an example of a genetic placement algorithm process 200 applied by a via placement tool (e.g., via placement tool 1070 of FIG. 10) according to an embodiment. The genetic placement algorithm process 200 includes a genetic via placement solver 202 that compiles and analyzes 204 a problem specification 206 to support generation of random solutions 208, evaluation of solutions 210 and performance of mutation and re-combinations 212. Evaluation of solutions 210 is performed with respect to a fitness function 214, where resulting solutions can be ranked 216 and compared to placement criteria 218 to determine whether a solution 220 meets the placement criteria or if performance of mutation and re-combinations 212 is needed to continue with the evaluation of solutions 210. For example, the solution 220 can include radial and angular shifts to existing positions of vias, such as signal vias 104A-104D and ground via 106 of FIG. 1.

Figure 3:
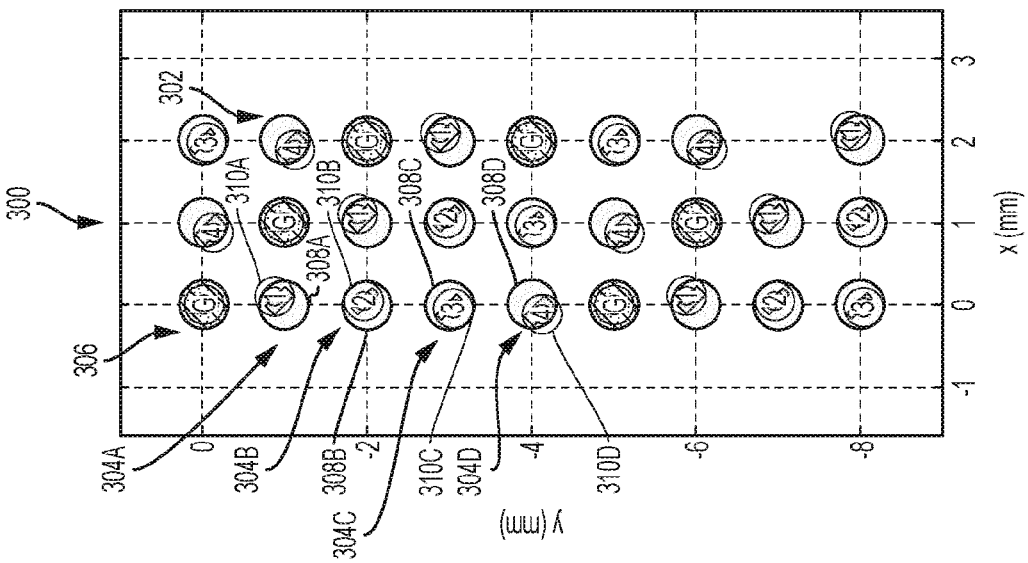
FIG. 3 depicts an example of signal via placement shifting with a 4:1 signal-to-ground ratio in a multi-layer circuit board according to an embodiment.

The problem specification 206 can be defined according to equation 1 as $\vec{\delta r}_n = \rho_n \angle \varnothing_n$ for $n \in 1 \ldots N$ for shifts in N unique via positions in the configuration. There can be fewer unique positions N than vias defined. For instance, the example of FIG. 3 illustrates a condition of N=4 with 21 shifted signal vias. Equation 2 defines via positions to test as: $\vec{r}_i = \vec{r'}_i + \vec{\delta r}_n$. The fitness function 214 can be defined according to equation 3: $d_k = \min_{\forall i \neq j} |\vec{r}_i - \vec{r}_j|$, where $\vec{r}_i$ and $\vec{r}_j$ are back-drilled via positions with shifts applied according to a shift constraint. As one example, the shift constraint can be to set the fitness=$d_k$ if $d_k \geq 0.5$ mm; otherwise the fitness can be set to $$-\frac{50}{\min\{d_j\} + \text{near\_zero\_value}}.$$

The near zero value prevents a divide by zero condition. The values of 0.5 mm and 50 can be adjusted depending upon the desired via position shift limitations. The genetic via placement solver 202 iterates until a solution 220 meeting the placement criteria 218 is identified. Solutions can include different radius values (mm) and angles (degrees) for each signal via 104A-104D in a 4:1 signal via to ground via configuration with instances of the solution repeated for the multi-layer circuit board 101 to support module 110 of FIG. 1, for instance. Manual adjustments to the solution 220 can be made if desired, or the problem specification 206 can be further refined to enhance alignment of a regular pattern that meets the minimum separation requirements. For instance, as one example that maintains a minimum separation of 1.0806 mm (which is greater than a 1.06 mm restriction), signal via 104A can be shifted 0.165 mm at an angle of 45 degrees, signal via 104B can be shifted 0.055 mm at an angle of 45 degrees, signal via 104C can be shifted 0.055 mm at an angle of −135 degrees, and signal via 104D can be shifted 0.165 mm at an angle of −135 degrees.

FIG. 3 depicts an example of signal via placement shifting 300 with a 4:1 signal-to-ground ratio in a multi-layer circuit board according to an embodiment. A portion of a repeating pattern of via groups 302 each including four signal vias 304A-304D and a ground via 306 (i.e., a 4:1 signal via to ground via ratio) is depicted in FIG. 3, with only positions of the signal vias 304A-304D shifting. Signal via 304A is typically centered under pad 308A; however, upon executing the genetic placement algorithm process 200 of FIG. 2, a shifted signal via position 310A is determined with respect to the signal via 304A that meets placement constraints (e.g., placement criteria 218 of FIG. 2). Similarly, signal vias 304B, 304C, and 304D are moved off center from pads 308B, 308C, and 308D to shifted signal via positions 310B, 310C, and 310D respectively. The magnitude of position shifting can vary for one or more of the shifted signal via positions 310A-310D. When there is substantial overlap with the pads 308A-308D and the shifted signal via positions 310A-310D respectively, no additional alterations may be needed to establish electrical conductivity between the pads 308A-308D and the signal vias 304A-304D at the shifted signal via positions 310A-310D. Close alignment enables a via-in-pad structure that can be useful for land grid arrays and/or soldered sockets, for example. A relatively small shift in position can be sufficient to meet a back-drilling minimum pitch threshold. For instance, maintaining a minimum separation between the signal vias 304A-304D at the shifted signal via positions 310A-310D may result in a gain of 81 μm over a typical 1 mm pitch (i.e., a pitch of 1.0806 mm), which exceeds the back-drilling minimum pitch threshold of 1.06 mm.

The ground vias 306 and pads 308A-308D maintain a substantially uniform distribution for the multi-layer circuit board 101 of FIG. 1. The substantially uniform distribution need not be a precisely uniform distribution and can vary within a manufacturing tolerance. As part of a manufacturing process, a via placement tool (e.g., via placement tool 1070 of FIG. 10) can be executed on a processor to determine and modify the positioning of signal vias 304A-304D as embodiments of the signal vias 104 in the multi-layer circuit board 101 of FIG. 1. Initially, in the substantially uniform distribution, the signal vias 304A-304D and ground vias 306 can be distributed substantially equally to align with the bottom surface metal pitch of module 110 of FIG. 1. In the example of FIG. 3, vias 304 and 306 are grouped in a configuration of four signal vias 304A-304D to one ground via 306. There can be many neighboring groups of signal vias 304A-304D to which embodiments are applied.

Since ground vias 306 do not need to be back-drilled, signal vias 304A-304D can be moved closer to ground vias 306 as long as a sufficient distance is maintained to prevent a short circuit to ground. By positioning the signal vias 304A-304D closer to ground vias 306, the target minimum drilling distance can be maintained as the signal via pitch is increased to be greater than the bottom surface metal pitch by moving the signal vias 304A-304D much closer to ground vias 306. Conversely, the distance between a number of the signal vias 304A-304D and the ground vias 306 is reduced to be less than the bottom surface metal pitch.

Figure 4:
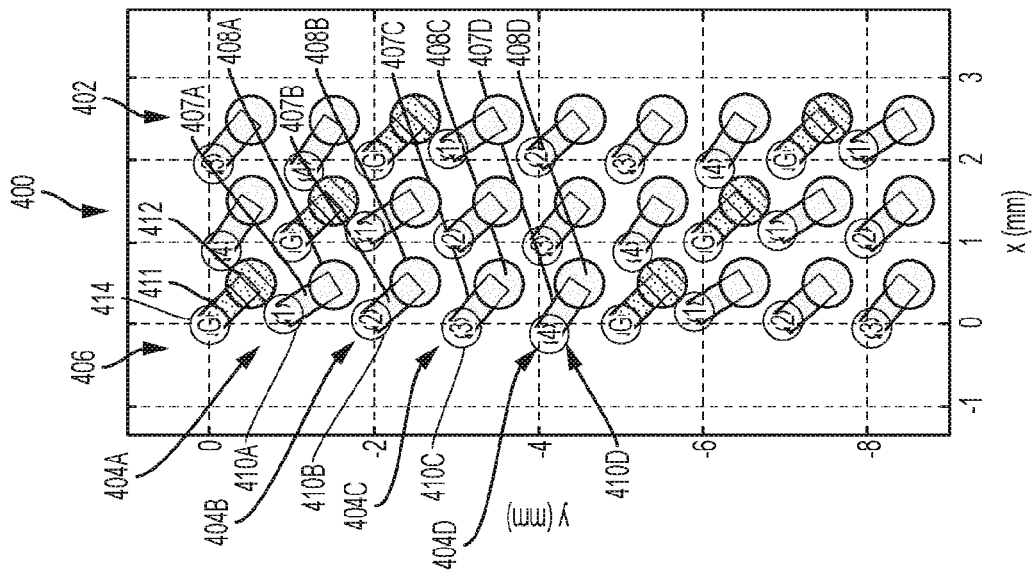
FIG. 4 depicts an example of signal via and ground via placement shifting with a 4:1 signal-to-ground ratio in a multi-layer circuit board according to an embodiment.

FIG. 4 depicts an example of signal via and ground via placement shifting 400 with a 4:1 signal-to-ground ratio in a repeating pattern of via groups 402 and having a larger shift as compared to the shifting of FIG. 3. In order to reposition signal vias 404A-404D without requiring a shift or size change to the bottom surface metal 108 on module 110 of FIG. 1, extensions to pads 408A, 408B, 408C, and 408D can be added to the uppermost layer 102A of the multi-layer circuit board 101 of FIG. 1 to align with bottom surface metal 108 of module 110 to be coupled to the multi-layer circuit board 101 as depicted in FIG. 4. Pad extensions 407A, 407B, 407C, and 407D may be in the form of "dog bones" that provide a conductive path on the uppermost layer 102A between shifted signal via positions 410A, 410B, 410C and 410D after the signal vias 404A-404D are shifted from the locations of pads 408A-408D. Thus, even if the signal vias 404A-404D do not directly align with bottom surface metal 108 of FIG. 1 after positioning, the pad extensions 407A-407D can establish electrical continuity between the signal vias 404A-404D and respective bottom surface metal 108 of FIG. 1.

In FIG. 4, each of the ground vias 406 is also shifted using pad extension 411 from the location of pad 412 to a shifted ground via position 414. In some embodiments, the size of pad extensions 407A-407D and 411 is the same, although the orientation and placement location can vary as determined by a via placement tool (e.g., via placement tool 1070 of FIG. 10) using the genetic placement algorithm process 200 of FIG. 2. Thus, although the pads 408A-408D and 412 have a substantially uniform distribution, the pad extensions 407A-407D and 411 enable a number of non-uniform placement options for signal vias 404A-404D and ground vias 406 such that sufficient back-drilling margin exists between the signal vias 404A-404D.

Figure 5:
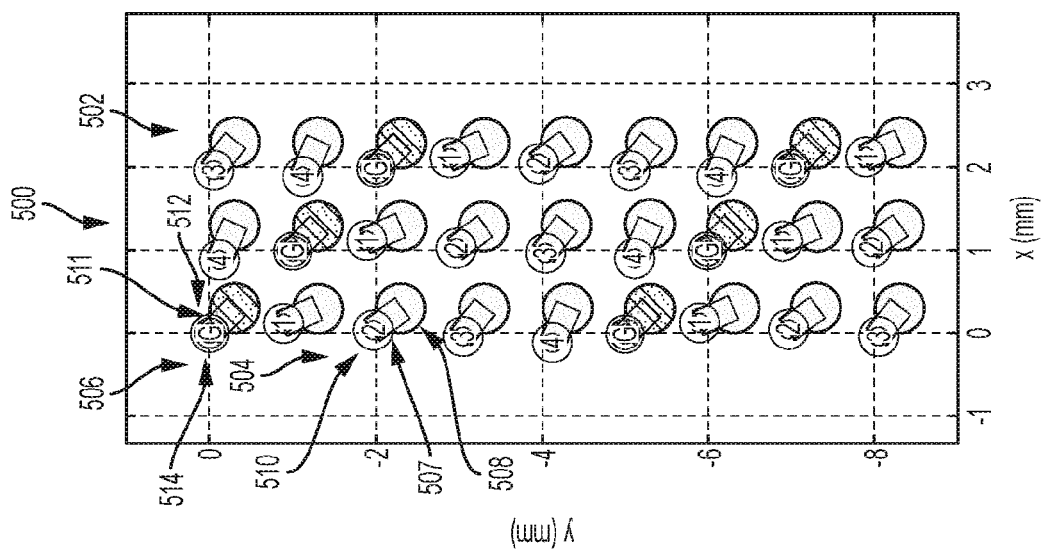
FIG. 5 depicts another example of signal via and ground via placement shifting with a 4:1 signal-to-ground ratio in a multi-layer circuit board according to an embodiment.

FIG. 5 depicts another example of signal via and ground via placement shifting 500 with a 4:1 signal-to-ground ratio in a repeating pattern of via groups 502 and having a smaller shift as compared to the shifting of FIG. 4. Pad extensions 507 are shorter than pad extensions 407A-407D of FIG. 4 such that signal vias 504 at shifted signal via positions 510 are in closer physical proximity to pads 508 as compared to the example of FIG. 4. Similarly, ground vias 506 use a pad extension 511 from the location of pad 512 to a shifted ground via position 514 that is shorter relative to the pad extension 411 of FIG. 4.

Figure 6:
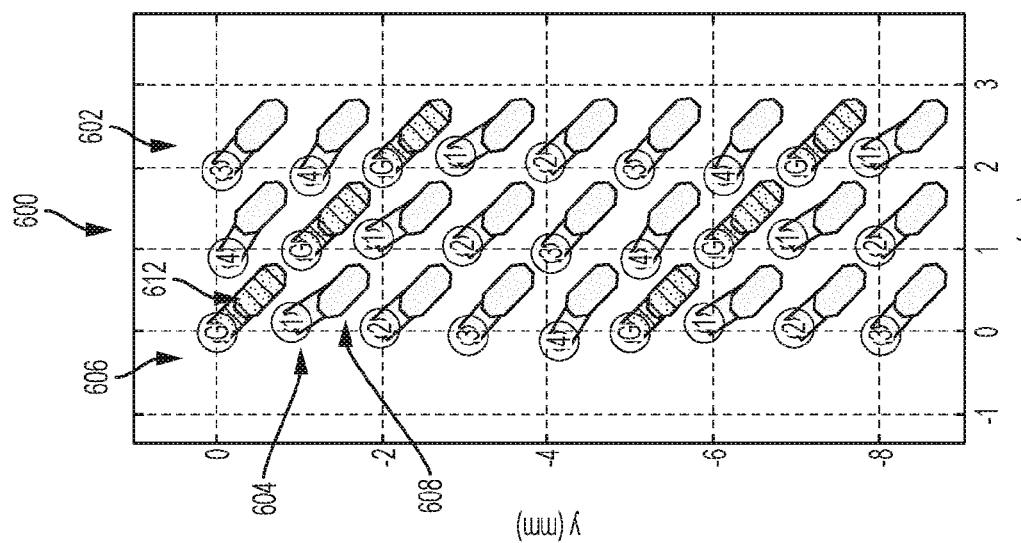
FIG. 6 depicts an example of signal via and ground via placement shifting using elongated pads with a 4:1 signal-to-ground ratio in a multi-layer circuit board according to an embodiment.

FIG. 6 depicts an example of signal via and ground via placement shifting 600 using elongated pads with a 4:1 signal-to-ground ratio in a repeating pattern of via groups 602. The signal vias 604 are electrically coupled to elongated pads 608 rather than substantially circular shaped pads. Similarly, ground vias 606 can each be electrically coupled to an elongated pad 612. The use of elongated pads 608 and 612 may be preferable depending on the connecting surface orientation, for instance, land grid array pin orientation.

Figure 8:
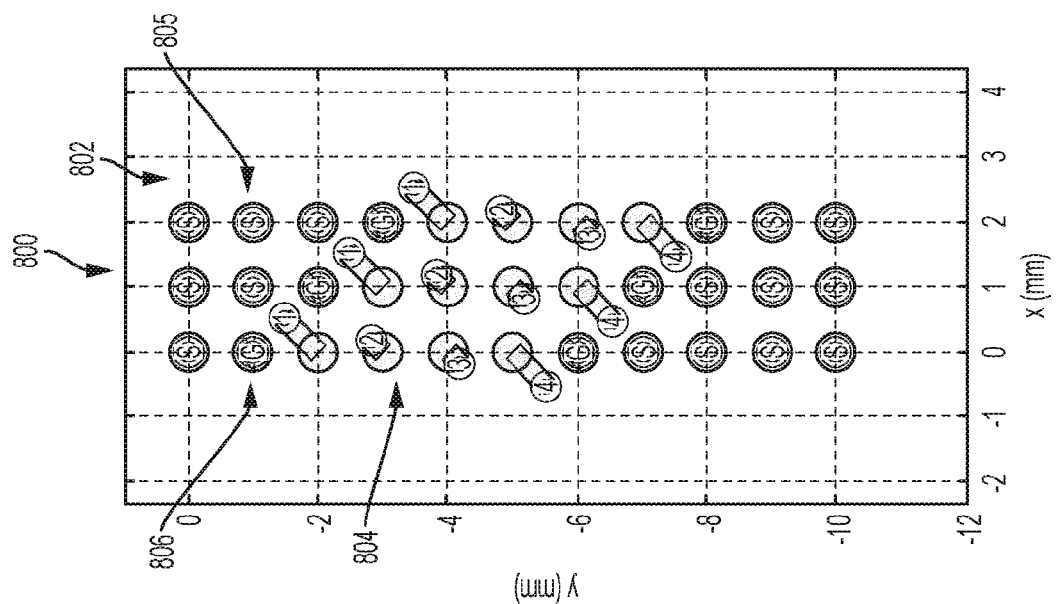
FIG. 8 depicts another example of selectively shifting a subset of signal vias with a 4:1 signal-to-ground ratio in a multi-layer circuit board according to an embodiment.
Figure 7:
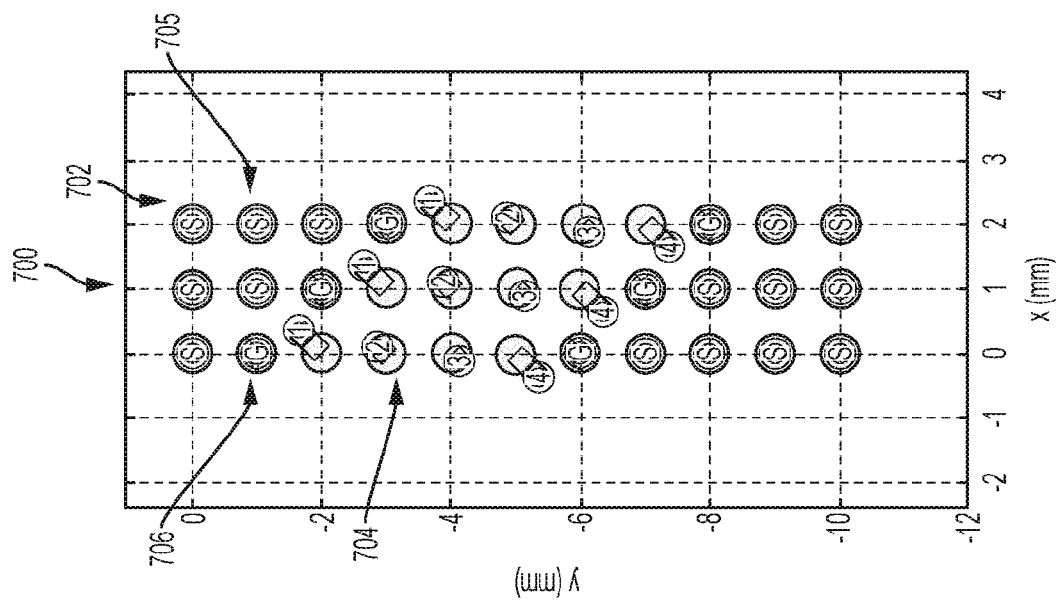
FIG. 7 depicts an example of selectively shifting a subset of signal vias with a 4:1 signal-to-ground ratio in a multi-layer circuit board according to an embodiment.
Figure 9:
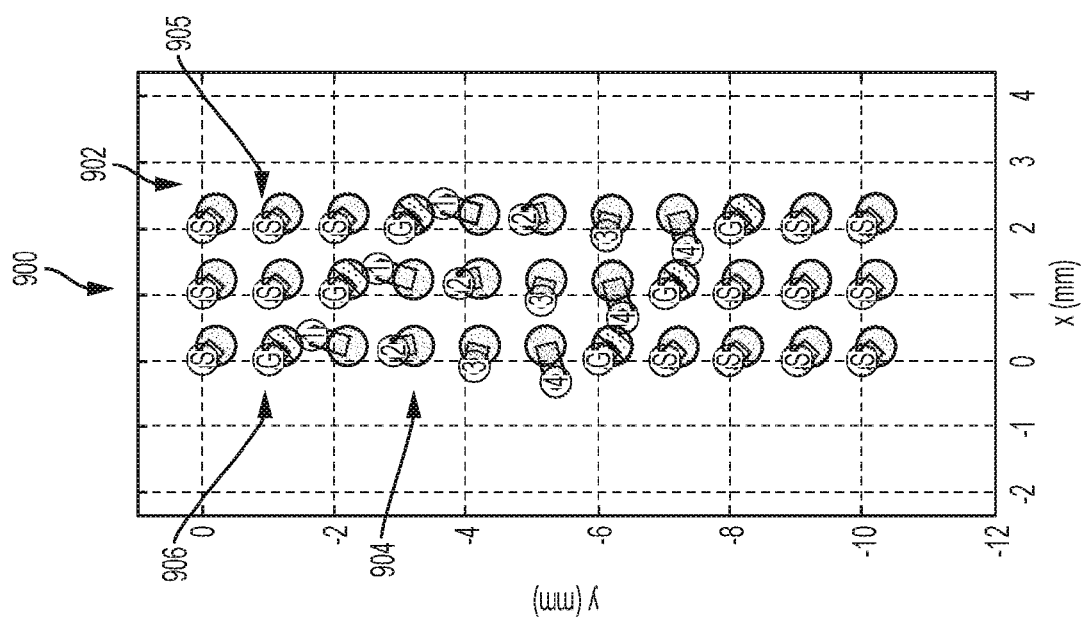
FIG. 9 depicts another example of signal via and ground via placement shifting with a 4:1 signal-to-ground ratio in a multi-layer circuit board according to an embodiment.

Further separation between back-drilled signal vias can be achieved by further differentiating signal vias between back-drilled and non-back-drilled signal vias as illustrated in FIGS. 7-9. FIG. 7 depicts an example of selectively shifting 700 a subset of signal vias with a 4:1 signal-to-ground ratio in a repeating pattern of via groups 702. Non-back-drilled signal vias 705 and ground vias 706 are not shifted, while signal vias 704 are shifted. The non-back-drilled signal vias 705 can be configured to carry lower operating frequencies as compared to signal vias 704 (e.g., power vias and lower speed signaling vias). Similarly, FIG. 8 depicts an example of selectively shifting 800 a subset of signal vias with a 4:1 signal-to-ground ratio in a repeating pattern of via groups 802. Non-back-drilled signal vias 805 and ground vias 806 are not shifted, while signal vias 804 are shifted. A larger magnitude of shifting occurs with respect to FIG. 8 as compared to FIG. 7 by setting a different radial shift limit in the genetic placement algorithm process 200 of FIG. 2 for the shifting 800 as compared to the shifting 700. For instance, with respect to FIG. 7, signal vias 704 may achieve a minimum separation of 1.2552 mm with a radial shift limit of 0.5 mm, while signal vias 804 may achieve a minimum separation of 1.399 mm with a radial shift limit of 0.75 mm in designs with a 1.06 mm restriction. The solution can be scaled to high or lower pitch/separation limits. For instance, when scaled to a 0.8 mm pitch design, a separation of 1.119 mm may be achieved according to embodiments. In the example of FIG. 9, shifting 900 of various amounts in a repeating pattern of via groups 902 can be performed for signal vias 904, non-back-drilled signal vias 905, and ground vias 906.

Figure 10:
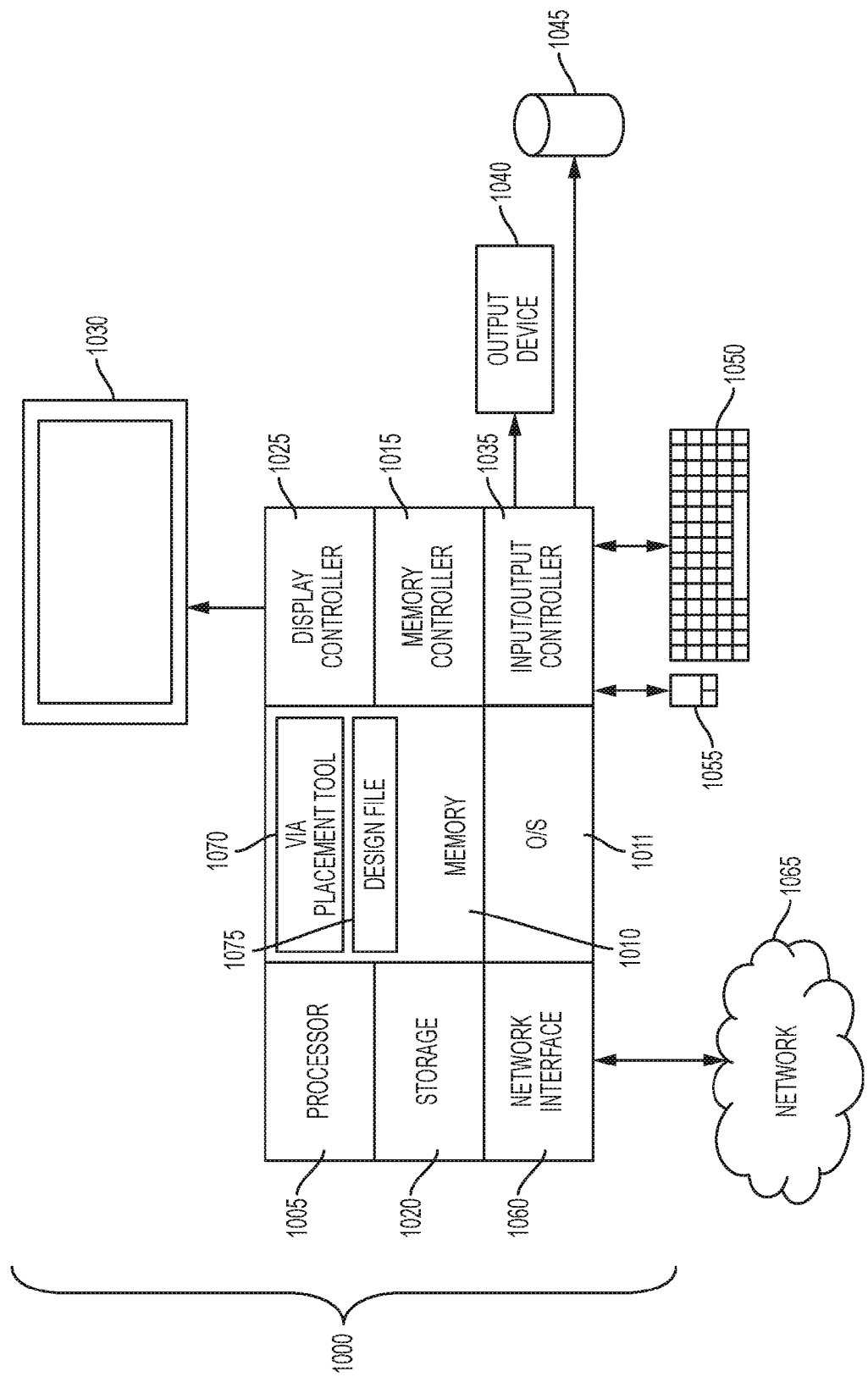
FIG. 10 illustrates a system for signal via positioning in a multi-layer circuit board in accordance with an exemplary embodiment.

FIG. 10 illustrates a block diagram of a computer system 1000 for use in signal via positioning in a multi-layer circuit board according to some embodiments. The systems and methods described herein may be implemented in hardware, software (e.g., firmware), or a combination thereof. In some embodiments, the methods described may be implemented, at least in part, in hardware and may be part of the microprocessor of a computer system 1000, such as a personal computer, workstation, minicomputer, tablet computer, mobile device, or mainframe computer. The computer system 1000 is also referred to as circuit design system 1000 and can be equipped with additional software and hardware to support circuit design, layout, and manufacturing of a multi-layer printed circuit board.

In some embodiments, as shown in FIG. 10, the computer system 1000 includes a processor 1005, physical memory 1010 coupled to a memory controller 1015, and one or more input devices 1045 and/or output devices 1040, such as peripherals, that are communicatively coupled power via a local I/O controller 1035. These devices 1040 and 1045 may include, for example, a printer, a scanner, a microphone, and the like. Input devices such as a conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1040, 1045 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in the physical memory 1010. The processor 1005 may be a custom made or commercially available processor, a central processing unit (CPU), an auxiliary processor among several processors associated with the computer system 1000, a semiconductor based microprocessor (in the form of a microchip or chip set), a macroprocessor, or other device for executing instructions.

The memory 1010 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, or other types of storage media. Note that the memory 1010 may have a distributed architecture, where various components are situated remote from one another but may be accessed by the processor 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1020, which may be a storage device such as a hard disk drive or solid state drive.

The computer system 1000 may further include a display controller 1025 coupled to a display 1030. In some embodiments, the computer system 1000 may further include a network interface 1060 for coupling to a network 1065.

Systems and methods according to this disclosure may be embodied, in whole or in part, in computer program products or in computer systems 1000, such as that illustrated in FIG. 10. For example, a via placement tool 1070 can access a design file 1075 to determine a layout definition of a multi-layer circuit board and transform the layout definition of the multi-layer circuit board according to the methods described herein for signal via positioning. The via placement tool 1070 may be comprised of program instructions executable by the processor 1005. The via placement tool 1070 can be stored in a computer readable storage medium such as the memory 1010 and/or storage 1020. Similarly, the design file 1075 can be stored in a computer readable storage medium such as the memory 1010 and/or storage 1020. The via placement tool 1070 and/or design file 1075 may be received over the network 1065, and updates to the design file 1075 can be transmitted over the network 1065 to support other circuit board manufacturing operations. Although only a single via placement tool 1070 and design file 1075 are depicted in FIG. 10, it will be understood that the via placement tool 1070 and/or design file 1075 can be further subdivided, distributed, or incorporated as part of another application, file system, or data structure.

Figure 11:
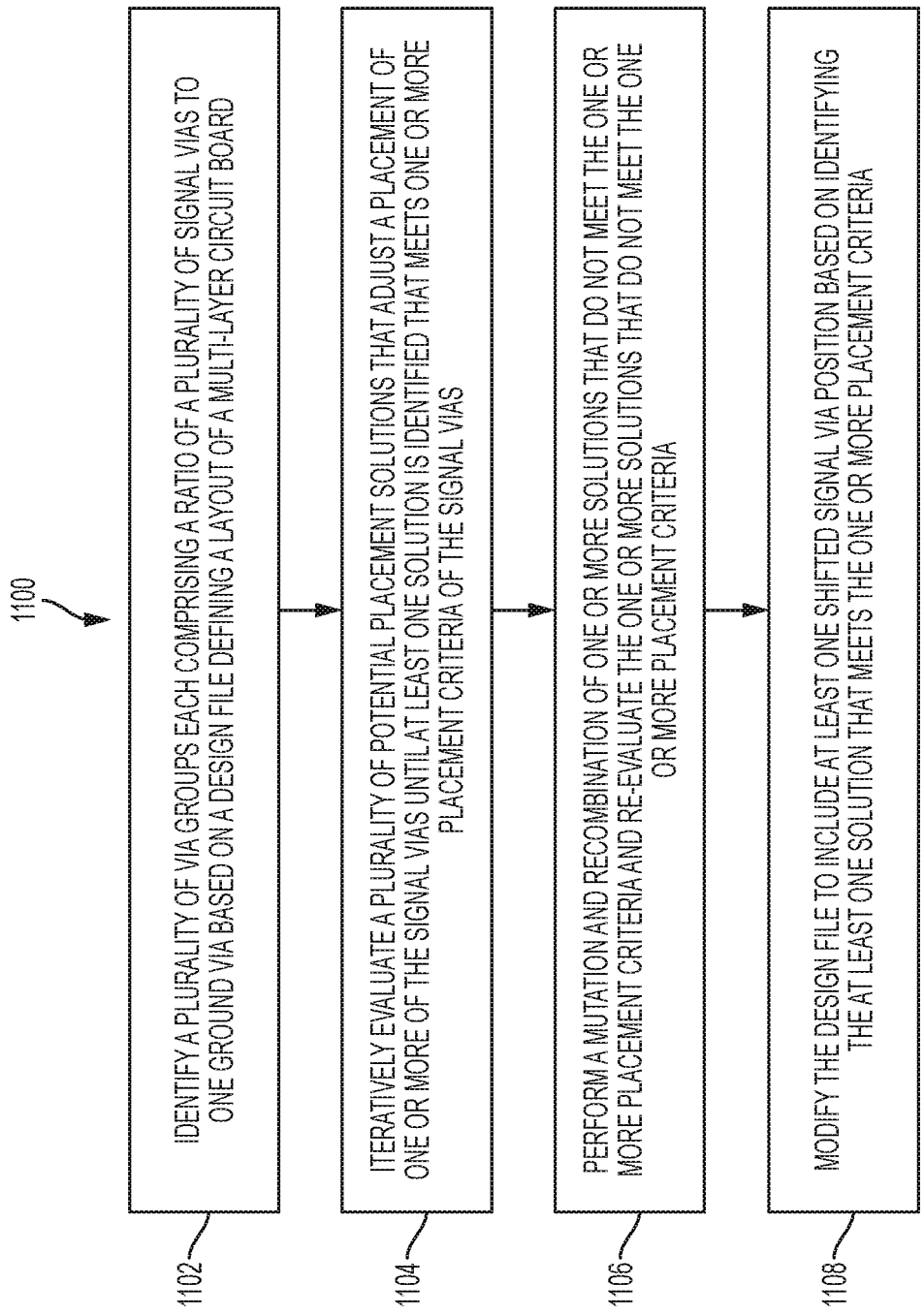
FIG. 11 illustrates a process of positioning signal vias in a multi-layer circuit board in accordance with an exemplary embodiment.

FIG. 11 illustrates a flow diagram of a method 1100 for signal via positioning in a multi-layer circuit board in accordance with an exemplary embodiment. The method 1100 can be performed by the via placement tool 1070 executing on the processor 1005 of a circuit design system 1000 of FIG. 10 and is further described in reference to FIGS. 1-10 for purposes of explanation. However, the method 1100 of FIG. 11 can be implemented on systems with alternate configurations and elements beyond those depicted in the examples of FIGS. 1-10. The design file 1075 is readable by manufacturing equipment to produce a tangible realization of the system 100 of FIG. 1 that complies with the constraints and conditions as previously described.

At block 1102, the via placement tool 1070 executing on processor 1005 of circuit design system 1000 identifies a plurality of via groups (e.g., groups 302) each including a ratio of a plurality of signal vias (e.g., signal vias 304A-304D) to one ground via (e.g., ground via 306) based on a design file 1075 defining a layout of the multi-layer circuit board 101.

At block 1104, genetic via placement solver 202 iteratively evaluates a plurality of potential placement solutions that adjust a placement of one or more of the signal vias (e.g., signal vias 304A-304D) until at least one solution is identified that meets one or more placement criteria 218 of the signal vias (e.g., signal vias 304A-304D). Evaluation of the potential placement solutions can be performed with respect to a fitness function 214 that compares back-drilled via positions with shifts applied according to a shift constraint. The potential placement solutions can include a plurality of different radius values and angles to shift one or more of the signal vias (e.g., to shifted signal via position 310A-310D). The one or more placement criteria 218 can define a minimum separation between the signal vias (e.g., signal vias 304A-304D) subject to back-drilling. The potential placement solutions may include shifting one or more of the signal vias (e.g., signal vias 304A-304D) closer to the ground via (e.g., ground via 306) in a same group or a different group such that a distance between the at least one shifted signal via position and the ground via is less than the minimum separation between the signal vias (e.g., signal vias 304A-304D) subject to back-drilling. The potential placement solutions can include shifting one or more of the signal vias (e.g., signal vias 704) closer to a non-back-drilled signal via (e.g., non-back-drilled signal vias 705) such that a distance between the at least one shifted signal via position and the non-back-drilled signal via is less than the minimum separation between the signal vias subject to back-drilling.

At block 1106, genetic via placement solver 202 performs a mutation and recombination of one or more solutions that do not meet the one or more placement criteria 218 and re-evaluates the one or more solutions that do not meet the one or more placement criteria 218.

At block 1108, the design file 1075 is modified to include at least one shifted signal via position (e.g., shifted signal via position 310A-310D) based on identifying the at least one solution 220 that meets one or more placement criteria 218. The design file 1075 may also be modified to add one or more pad extensions (e.g., pad extensions 407A-407D and 411) to an uppermost layer 102A of the multi-layer circuit board 101 to align with bottom surface metal 108 of module 110 to be coupled to the multi-layer circuit board 101. Each of the one or more pad extensions can establish an electrical connection with one of the signal vias after the positioning. In some embodiments, an elongated pad (e.g., elongated pads 608 and 612) is coupled to the one or more pad extensions to align with bottom surface metal of the module 110.

Technical effects and benefits include modifying a design layout of a multi-layer circuit board such that signal vias in a 4:1 signal to ground via ratio configuration are separated to meet or exceed target minimum drilling distance defined by manufacturing constraints while maintaining the same bottom surface metal pitch under modules coupled to the multi-layer circuit board. This enables sufficient separation to perform back-drilling of the signal vias without compromising electrical or mechanical characteristics of the multi-layer circuit board. Alteration of the uppermost layer of the multi-layer circuit board can be performed to align with bottom surface metal of a module to be coupled to the multi-layer circuit board.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    identifying, by a via placement tool executing on a processor of a circuit design system, a plurality of via groups each comprising a ratio of a plurality of signal vias to one ground via based on a design file defining a layout of a multi-layer circuit board;
    iteratively evaluating, by a genetic via placement solver, a plurality of potential placement solutions that adjust a placement of one or more of the signal vias until at least one solution is identified that meets one or more placement criteria of the signal vias, wherein the potential placement solutions comprise shifting one or more of the signal vias closer to the ground via in a same group or a different group such that a distance between the at least one shifted signal via position and the ground via is less than a minimum separation between the signal vias subject to back-drilling;
    performing, by the genetic via placement solver, a mutation and recombination of one or more solutions that do not meet the one or more placement criteria and re-evaluating the one or more solutions that do not meet the one or more placement criteria;
    modifying the design file to include at least one shifted signal via position based on identifying the at least one solution that meets the one or more placement criteria; and
    fabricating the multi-layer circuit board based on the modified design file.

2. The method of claim 1, wherein the potential placement solutions comprise a plurality of different radius values and angles to shift one or more of the signal vias.

3. The method of claim 1, further comprising:
    adding one or more pad extensions to an uppermost layer of the multi-layer circuit board to align with bottom surface metal of a module to be coupled to the multi-layer circuit board, each of the one or more pad extensions establishing an electrical connection with one of the signal vias after the positioning.

4. The method of claim 3, wherein an elongated pad is coupled to the one or more pad extensions to align with bottom surface metal of the module.

5. The method of claim 1, further comprising:
transmitting the modified design file over a network to support circuit board manufacturing operations based on the modified design file.

6. A method comprising:
identifying, by a via placement tool executing on a processor of a circuit design system, a plurality of via groups each comprising a ratio of a plurality of signal vias to one ground via based on a design file defining a layout of a multi-layer circuit board;
iteratively evaluating, by a genetic via placement solver, a plurality of potential placement solutions that adjust a placement of one or more of the signal vias until at least one solution is identified that meets one or more placement criteria of the signal vias, wherein the potential placement solutions comprise shifting one or more of the signal vias closer to a non-back-drilled signal via such that a distance between the at least one shifted signal via position and the non-back-drilled signal via is less than a minimum separation between the signal vias subject to back-drilling;
performing, by the genetic via placement solver, a mutation and recombination of one or more solutions that do not meet the one or more placement criteria and re-evaluating the one or more solutions that do not meet the one or more placement criteria;
modifying the design file to include at least one shifted signal via position based on identifying the at least one solution that meets the one or more placement criteria; and
fabricating the multi-layer circuit board based on the modified design file.

7. The method of claim 6, wherein the potential placement solutions comprise a plurality of different radius values and angles to shift one or more of the signal vias.

8. The method of claim 6, further comprising:
adding one or more pad extensions to an uppermost layer of the multi-layer circuit board to align with bottom surface metal of a module to be coupled to the multi-layer circuit board, each of the one or more pad extensions establishing an electrical connection with one of the signal vias after the positioning.

9. The method of claim 8, wherein an elongated pad is coupled to the one or more pad extensions to align with bottom surface metal of the module.

10. The method of claim 6, further comprising:
transmitting the modified design file over a network to support circuit board manufacturing operations based on the modified design file.

\* \* \* \* \*